(12) United States Patent
Compton

(10) Patent No.: US 7,927,104 B2
(45) Date of Patent: Apr. 19, 2011

(54) EDUCATIONAL GAME APPARATUS

(76) Inventor: Dane Werley Compton, Garfield, MN (US)

( * ) Notice: Subject to any disclaimer, the term of this patent is extended or adjusted under 35 U.S.C. 154(b) by 275 days.

(21) Appl. No.: 12/354,862

(22) Filed: Jan. 16, 2009

(65) Prior Publication Data

US 2010/0184007 A1    Jul. 22, 2010

(51) Int. Cl.
*G09B 19/02* (2006.01)
(52) U.S. Cl. ........................................... 434/188
(58) Field of Classification Search .................. 434/128, 434/188, 189, 191, 198, 199, 203, 206, 208, 434/209
See application file for complete search history.

(56) References Cited

U.S. PATENT DOCUMENTS

| | | | | | |
|---|---|---|---|---|---|
| 4,114,290 | A | * | 9/1978 | Cooper | 434/200 |
| 4,176,472 | A | * | 12/1979 | Devanney | 434/203 |
| 4,233,757 | A | * | 11/1980 | Narcise | 434/203 |
| 5,083,793 | A | * | 1/1992 | Sanford | 273/249 |
| 5,413,484 | A | * | 5/1995 | Banerjee et al. | 434/128 |
| 5,423,682 | A | * | 6/1995 | Hildebrandt | 434/195 |
| 5,688,126 | A | * | 11/1997 | Merritt | 434/128 |
| 5,769,639 | A | * | 6/1998 | Foster | 434/159 |
| 5,927,718 | A | * | 7/1999 | Heaton | 273/272 |
| 6,676,415 | B2 | * | 1/2004 | Walker et al. | 434/203 |
| 6,811,402 | B1 | * | 11/2004 | Ritchie | 434/191 |
| 7,300,286 | B2 | * | 11/2007 | Palang | 434/203 |
| 7,828,553 | B2 | * | 11/2010 | Baerg | 434/203 |

* cited by examiner

*Primary Examiner* — Kurt Fernstrom
(74) *Attorney, Agent, or Firm* — Jerry D. Haynes; Law Office of Jerry D. Haynes

(57) ABSTRACT

Disclosed is an educational game apparatus for playing a game by a plurality of players. The educational game apparatus comprises a playing rack member, a pair of dice, and a winner indication member. The playing rack member comprises a pair of lateral members, and a plurality of transverse members coupled to configure a turn record section, a score record section, and a number section. The turn record section records turns played by a player during the game, and records a lucky number selected by the player. The score record section records scores accumulated by the player during the game. The number section includes a plurality of blocks each with a set of numbers inscribed thereon. The pair of dice is tossed to turn a block from the plurality of blocks to score points. Further, the player with highest points secures the winner indication member on the playing rack member.

10 Claims, 5 Drawing Sheets

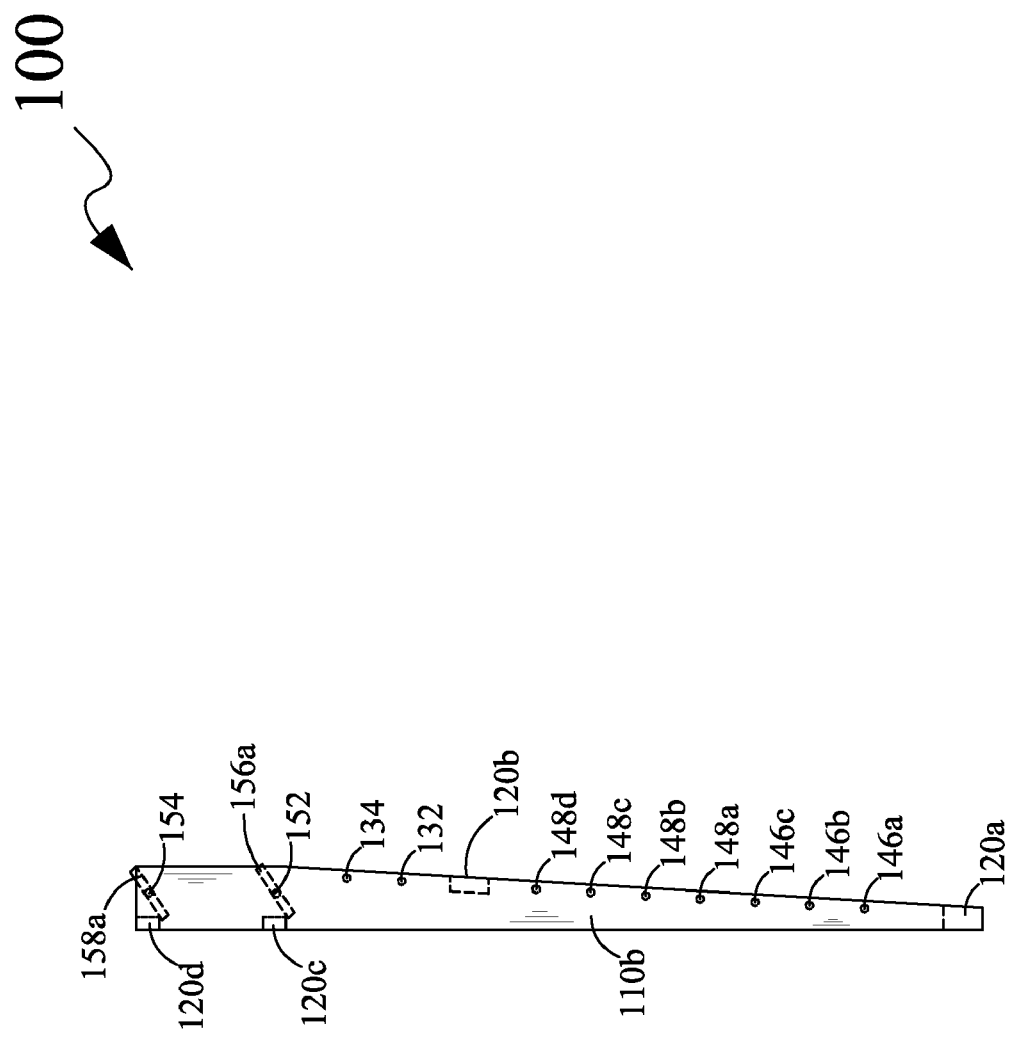

EDUCATIONAL GAME APPARATUS

FIELD OF THE INVENTION

The present invention relates to indoor game apparatuses, and more particularly, to an educational game apparatus that involves a basic arithmetic computation for scoring goals or points.

BACKGROUND OF THE INVENTION

These days, due to hectic life styles, people seldom find time to spend with families and friends. In order to spend a quality time together, people may prefer to play indoor games, such as board games with their family members and friends. The board games are a source of recreation and entertainment for young and old alike. For example, carom and other such indoor games provide entertainment when played with family and friends.

Although conventional board games allow people to have a lot of fun, such board games may become monotonous after some time. Further, other indoor games, such as educational games, and the like are also known, which on one hand entertain the children and/or the adults, and on other hand helps the children and/or the adults to enhance a specific or overall aptitude. Such educational games include mathematical games, vocabulary games, and the like.

The vocabulary games involve arrangements of letters to generate words. Similarly, the mathematical games involve manipulation of numbers, and basic processes and operations of mathematics, which enhance mathematical skill and entertain the children and/or the adults. However, most of such mathematical games generally involve a set of complicated rules that renders difficult children and/or adults' understanding of gameplay.

Further, most of such mathematical games are targeted for players belonging to a limited age range and focus only on a narrow range of mathematical skills to be learned. For example, many such mathematical games are targeted at preschool children, and teach basic addition and subtraction skills. Other such mathematical games are targeted at elementary school students and teach more complicated skills, such as multiplication, division, and fractions. Such mathematical games may not be suitable for players who do not fall within the targeted age group. An additional drawback of most of such mathematical games is that after playing these games for some time, the player becomes aware of the solutions of the game, and accordingly, the excitement associated therewith wears out quickly.

Accordingly, there exists a need for an educational game apparatus that is simple in construction, and involves simple rules and basic arithmetic computation to score goals or points. Further, there exists a need for an educational game apparatus for assisting children and/or adults in learning and understanding basic mathematical processes and operations, and also for entertaining them without wearing out the excitement associated therewith.

SUMMARY OF THE INVENTION

In view of the forgoing disadvantages inherent in the prior art, the general purpose of the present invention is to provide an educational game apparatus, to include all advantages of the prior art, and to overcome the drawbacks inherent in the prior art.

An object of the present invention is to provide an educational game apparatus that is simple in construction thereof, and involves simple rules and basic arithmetic computation to score goals or points.

Another object of the present invention is to provide an educational game apparatus that, on one hand, may assist children and/or adults in learning and understanding basic mathematical processes and operations, and enhance memory skill and a decision making approach thereof, and on other hand entertain them, without wearing out excitement associated with the game.

To achieve the above objects, in an aspect of the present invention, an educational game apparatus for playing a game by a plurality of players is provided. The educational game apparatus comprises a playing rack member, a pair of dice, and a winner indication member. The playing rack member comprises a pair of lateral members and a plurality of transverse members. Each lateral member of the pair of lateral members is spaced apart in parallel relation to the other. Each transverse member of the plurality of transverse members is also spaced apart in parallel relation to the other, and thereafter disposed between the pair of lateral members for configuring a turn record section, a score record section, and a number section.

The turn record section includes a first plurality of dowels that is spaced apart and disposed parallel to the plurality of transverse members. Each dowel of the first plurality of dowels has a first plurality of beads that is slidably disposed there along for recording turns played by a player of the plurality of players during the game, and for recording a lucky number selected by the player. Further, the score record section lies adjacent to the turn record section. The score record section includes a second plurality of dowels that is spaced apart, and disposed parallel to the plurality of transverse members. Each dowel of the second plurality of dowels has a second plurality of beads that is slidably disposed there along for recording scores accumulated by the player during the game. Furthermore, the number section lies adjacent to the turn record section. The number section includes a third plurality of dowels that is spaced apart and disposed parallel to the plurality of transverse members. Each dowel of the third plurality of dowels has a plurality of blocks pivotally coupled there along. Each block of the plurality of blocks has a top surface and a bottom surface. The top surface has a set of numbers inscribed thereon. At least one block exposing a respective top surface from the plurality of blocks is being pivotally rotated about a respective dowel of the third plurality of dowels to expose a respective bottom surface of the at least one block for recording the score corresponding to at least one number from the set of numbers inscribed on the respective top surface in the score record section.

Further, each die of the pair of dice configures six faces thereof. Each face of the six faces of the pair of dice has a plurality of numbers inscribed thereon. The plurality of numbers on the each face of at least one die of the pair of dice corresponds to at least one set of numbers inscribed on at least one top surface of at least one block of the plurality of blocks. Upon matching at least one number from the plurality of numbers inscribed a corresponding die of the pair of dice with at least one number of the set of numbers inscribed on a corresponding top surface of the plurality of blocks, the player pivotally rotates at least one block to expose a respective bottom surface thereof from the plurality of blocks of the number section. Furthermore, the winner indication member is capable of being secured on the playing rack member for indicating a winner player among the plurality of players playing the game.

This together with the other aspects of the present invention, along with the various features of novelty that characterized the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing, wherein like elements are identified with like symbols, and in which:

FIGS. 2A and 2B illustrate various views of a playing rack member of the educational game apparatus of FIG. 1, according to an embodiment of the present invention;

Like reference numerals refer to like parts throughout the description of several views of the drawings.

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "coupled," and variations thereof herein are used broadly and encompass direct and indirect couplings.

The terms, "top," "bottom," "side," "first," "second," and the like, herein do not denote any order, elevation or importance, but rather are used to distinguish placement of one element over another. Further, the terms, "a" and "an" herein do not denote a limitation of quantity, but rather denote the presence of at least one of the referenced item.

The present invention provides an educational game apparatus to engage children and/or adults with an entertaining multi-player game that focuses on memory skills, decision making, and basic arithmetic computation. The educational game apparatus is simple in construction, and involves simple rules and the basic arithmetic computation to score goals or points. More particularly, the educational game apparatus uses an abacus method for scoring rounds played and the game goals.

Figure 1:
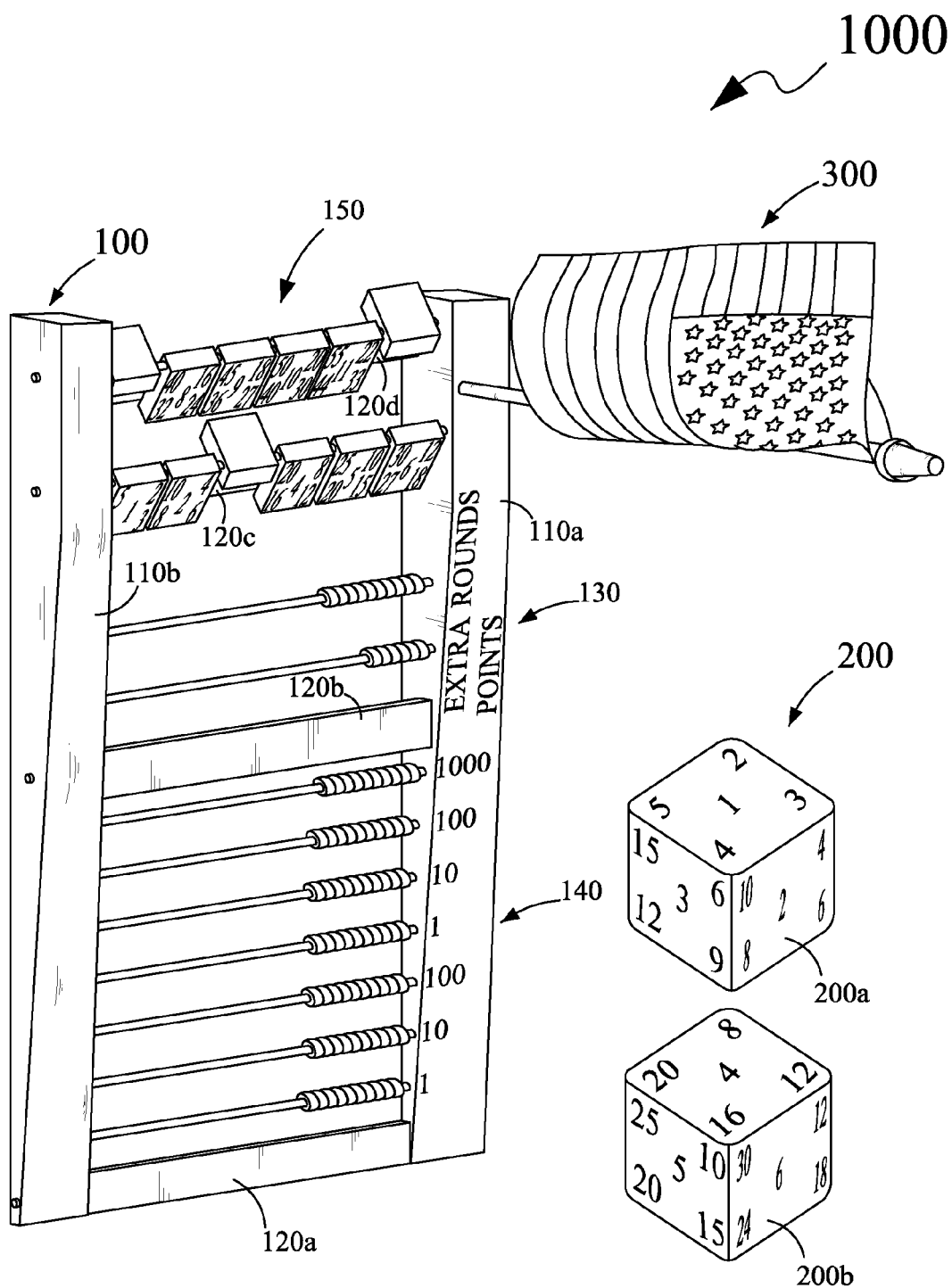
FIG. 1 illustrates a perspective view of an educational game apparatus, according to an embodiment of the present invention.

Referring now to FIG. 1, a perspective view of an educational game apparatus 1000 (hereinafter referred to as 'apparatus 1000'), according to an embodiment of the present invention is illustrated. The apparatus 1000 includes a playing rack member 100 (herein after referred to as 'rack 100'), a pair of dice 200, such as a die 200a, and a die 200b, and a winner indication member 300. The game may be played by a plurality of players (not shown) such that each player of the plurality of players may have at least one rack, such as the rack 100. Further, each player, upon turn thereof, may toss the pair of dice 200, and, accordingly follow a set of simple rules to perform a set of actions on the rack 100 to score points in order to achieve goals or points. Further, a winner player (not shown) from the plurality of players may secure the winner indication member 300 on the rack 100, thereby declaring himself/herself a winner of the game.

Figure 2A:
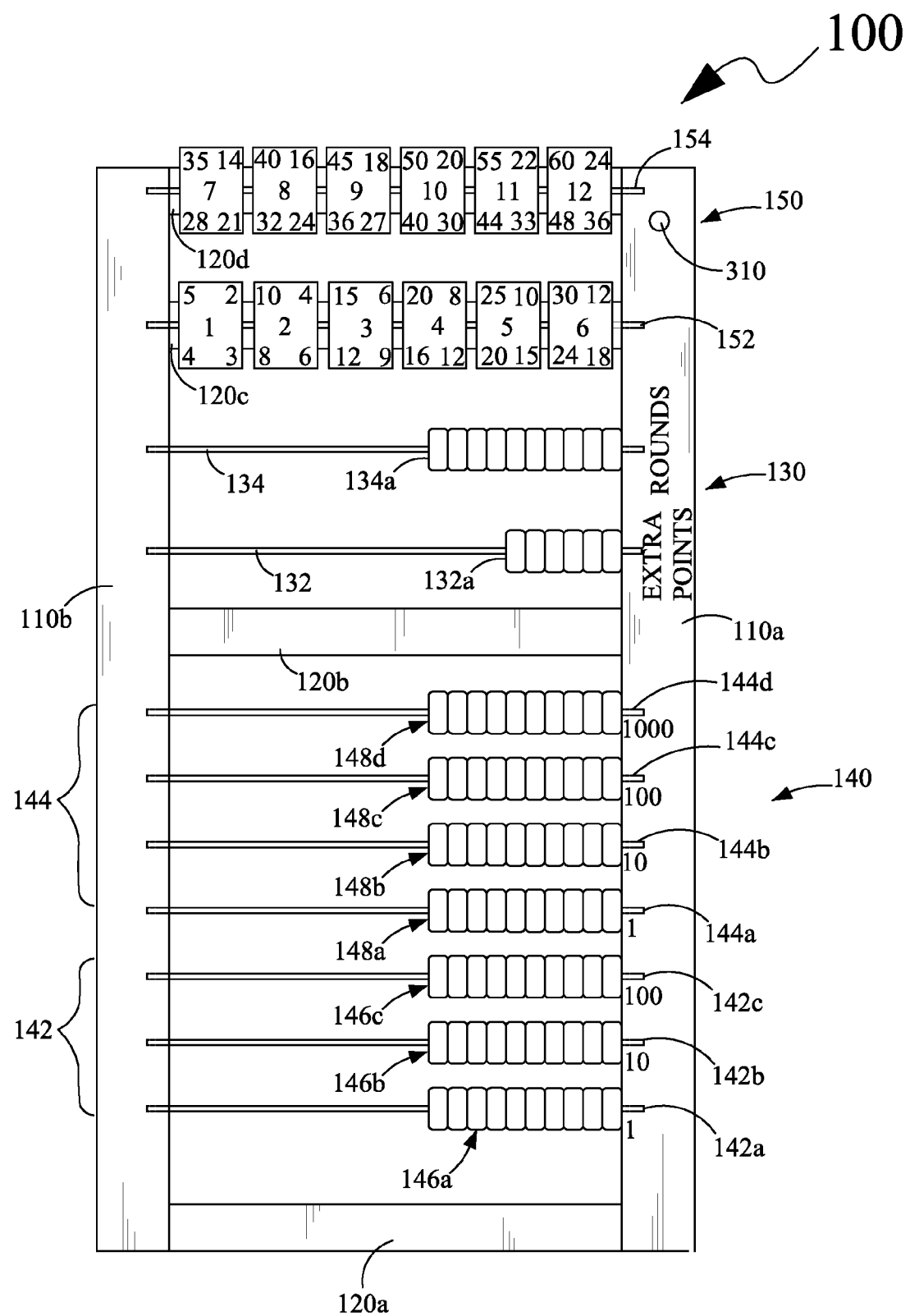

Referring now to FIGS. 2A and 2B, various views of the rack 100, according to an embodiment of the present invention are illustrated. More particularly, FIG. 2A illustrates a top view of the rack 100, and, FIG. 2B illustrates a side view of the rack 100. Also, referring to FIG. 2C, wherein a portion of the rack 100 of the apparatus 1000 is illustrated, according to an embodiment of the present invention. The rack 100 includes a pair of lateral members, such as lateral members 110a and 110b, and a plurality of transverse members, such as transverse members 120a, 120b, 120c, and 120d. The lateral members 110a and 110b are spaced apart in parallel relation to one another. The transverse members 120a, 120b, 120c, and 120d are also spaced apart in parallel relation to one another. Further, the transverse members 120a, 120b, 120c, and 120d (herein after collectively referred to as 'transverse members 120a-d') are disposed between the lateral members 110a and 110b for configuring a turn record section 130, a score record section 140, and a number section 150 of the rack 100.

The turn record section 130 of the rack 100 includes a first plurality of dowels, such as a first dowel 132, and a second dowel 134. The first dowel 132, and the second dowel 134 are spaced apart from each other, and, disposed parallel to the transverse members 120a-d between the lateral members 110a and 110b. The first dowel 132, and the second dowel 134 includes a first plurality of beads, such as a first set of beads 132a (hereinafter referred to as 'beads 132a'), and a second set of beads 134a (hereinafter referred to as 'beads 134a'), respectively, disposed there along in a slidable manner. The first dowel 132 includes the beads 132a for recording a lucky number selected by a player from the plurality of players. For recording the lucky number, a well known abacus method is used. Without departing from the scope of the present invention, in one embodiment of the present invention, numbers of beads, such as the beads 132a may be six in numbers, and, the player may select any number of the beads 132a, varying from one to six, in order to choose the lucky number thereof. The player following the abacus method, as per his/her chosen lucky number may slide a number of beads 134a, similar to the chosen lucky number, towards a blank side of the first dowel 132. For example, if the player has selected his/her lucky number as three, then he/she may slide three beads, such as the beads 132a to the blank side of the first dowel 132 by following the abacus method. Sliding selected number of the beads 132a towards the blank side of the first dowel 132, using the abacus method, enables the player to remember his/her lucky number throughout the game.

Further, the second dowel 134 includes the beads 134a for recording turns played by a player from the plurality of players during the game. For recording the turns played by the player, the abacus method is used. According to one embodiment of the present invention, the number of beads, such as the beads 134a may be ten in number, and, the player may select one bead from the beads 134a, every time one turn of the game is completed, in order to remember the total number of turns played in the game, by a player. For example, if the player has completed his/her first turn, he/she may slide one bead from the beads 134a towards a blank side of the second dowel 134. Sliding one bead from the beads 134a to the blank side of the second dowel 134 enables the player to record, and accordingly, remember total turns played by respective players in the game.

According to one embodiment of the present invention, for the enhancing an aesthetic appearance, and for easy identification of the purposes of the beads 132a and 134a, the beads 132a and 134a are employed with distinct colors. For example, the beads 132a may be employed with a pink color, and the beads 134a may be employed with a yellow color. However, the beads 132a and the beads 134a may assume any color without limiting the scope of the present invention. Hereinafter, the beads 132a will be referred to as pink beads 132a, and, the beads 134a will be referred to as yellow beads 134a. The purposes of beads, such as the pink beads 132a and the yellow beads 134a, may be easily identified by words, such as 'extra points' and 'rounds' the inscribed on the lateral member 110a, adjacent to the first dowel 132 and the second dowel 134.

As disclosed herein, the rack 100 includes the score record section 140. The score record section 140 is configured adjacent to the turn record section 130. The score record section 140 includes a second plurality of dowels, such as a bottom set of dowels 142, and a top set of dowels 144. The bottom set of dowels 142 include dowels 142a, 142b and 142c. The dowels 142a, 142b and 142c are spaced apart from each other, and disposed parallel to the transverse members 120a-d between the lateral members 110a and 110b. Similarly, the top set of dowels 144 includes dowels 144a, 144b, 144c and 144d. Further, similar to the dowels 142a, 142b, and 142c, the dowels 144a, 144b, 144c and 144d are also spaced apart from each other, and disposed parallel to the transverse members 120a-d between the lateral members 110a and 110b. The dowels 142a, 142b and 142c of the bottom set of dowels 142, and the dowels 144a, 144b, 144c and 144d of the top set of dowels 144 includes a second plurality of beads, such a bottom set of beads 146a, 146b, and 146c (hereinafter referred to as 'beads 146a, 146b, and 146c'), and, a top set of beads 148a, 148b, 148c and 148d (hereinafter referred to as 'beads 148a, 148b, 148c and 148d'), respectively. More particularly, the dowels 142a, 142b and 142c of the bottom set of dowels 142 includes the beads 146a, 146b, and 146c disposed, respectively, there along in a slidable manner. Similarly, the dowels 144a, 144b, 144c and 144d of the top set of dowels 144 includes the beads 148a, 148b, 148c and 148d disposed, respectively, there along in a slidable manner. The beads 146a, 146b, and 146c, respectively, on the dowels 142a, 142b, and 142c are capable of recording the score for each round. The beads 148a, 148b, 148c, and 148d, respectively, on the dowels 144a, 144b, 144c, and 144d are capable of recording the score accumulated by the player during the game."

More particularly, the beads 148a, 148b, 148c, and 148d, respectively, on the dowels 144a, 144b, 144c, and 144d are capable of recording the score transferred from the beads 146a, 146b, 146c from the first set of dowels 142, after each round.

Specifically, each bead of the beads 146a slidably disposed along the dowel 142a is allocated with a particular point. Similar to the beads 146a, each bead of beads 146b and the beads 146c are allocated with a particular point. Without departing from the scope of the present invention, the each bead of the beads 146a is allocated one point. Similarly, each bead of the beads 146b is allocated ten points, and each bead of the beads 146c is allocated one hundred points. Similarly, each bead of the beads 148a, 148b, 148c and 148d is allocated a particular point. Without departing from the scope of the present invention, the each bead of the beads 148a is allocated one point, the each bead of the beads 148b is allocated ten points, the each bead of the beads 148c is allocated one hundred points, and, the each bead of the beads 148d is allocated one thousand points. Such points may be inscribed on the lateral members 110a or 110b for comfort of the plurality of players.

All the beads, such as the beads 146a, 146b, and 146c are capable of being moved along blank sides of respective dowels, such as the dowels 142a, 142b and 142c for recording the score. Further, for representing a definite score on the beads 148a, 148b, 148c and 148d, the beads 146a, 146b, or 146c representing the definite score may be slid back to an initial position thereof, and the required beads from the beads 148a, 148b, 148c and 148d, may be moved towards blank sides of respective dowels, such as the dowels 144a, 144b, 144c and 144d. Accordingly, the definite score may be transferred from the first set of dowels to the second set of dowels 144.

Without departing from the scope of the present invention, in one embodiment of the present invention, the number of beads, such as the beads 146a, 146b, and 146c, respectively, on each of the dowels 142a, 142b and 142c is assumed to be ten. Further, the number of beads, such as the beads 148a, 148b, 148c and 148d, respectively, on each of the dowels 144a, 144b, 144c and 144d is assumed to be ten. The player following the abacus method, may record the score throughout the game. However, the number of the beads 146a, 146b, and 146c, and the beads 148a, 148b, 148c and 148d, may be increased on decreased, according to the requirement of the players or the apparatus.

According to one embodiment of the present invention, for the purpose of enhancing aesthetic appearance, and for easy identification of the purposes of the beads 146a, 146b, and 146c, and the beads 148a, 148b, 148c and 148d are employed with two different colors. For example, the beads 146a, 146b, and 146c may be employed with a black color, and the beads 148a, 148b, 148c and 148d may be employed with a white color. However, it will be evident to a person skilled in the art that the beads 146a, 146b, and 146c, and the beads 148a, 148b, 148c and 148d may assume any color apart from black and white. Hereinafter the beads 146a, 146b, and 146c will be referred to as black beads 146a, 146b, and 146c, and, the beads 148a, 148b, 148c and 148d will be referred to as white beads 148a, 148b, 148c and 148d.

Figure 2C:
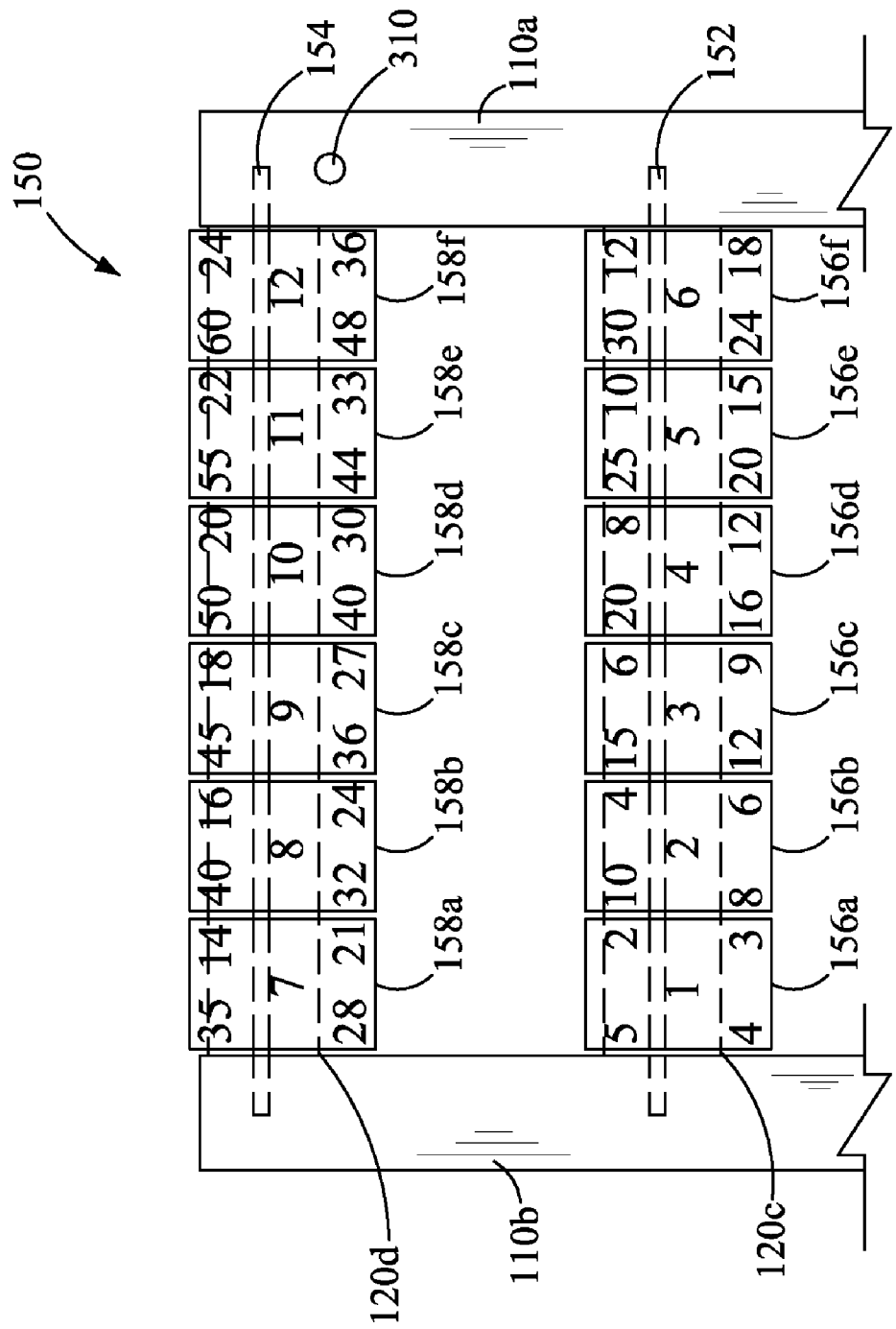
FIG. 2C illustrates a portion of the playing rack member of FIGS. 2A and 2B, according to an embodiment of the present invention.

Further, as disclosed herein, the rack 100 includes the number section 150. More particularly, a front view of the number section 150 is shown in FIG. 2C, and references herein of the same, along with FIGS. 2A and 2B, will be made to describe the number section 150. The number section 150 lies adjacent to the turn record section 130. The number section 150 includes a third plurality of dowels, such as a dowel 152 and a dowel 154. The dowel 152 and the dowel 154 are spaced apart, and disposed parallel to the transverse members 120a-d between the lateral members 110a and 110b. The dowel 152 and the dowel 154 include a plurality of blocks, such as blocks 156a, 156b, 156c, 156d, 156e, and 156f (hereinafter referred to as blocks 156a-f) and blocks 158a, 158b,

158c, 158d, 158e, and 158f (hereinafter referred to as blocks 158a-f), respectively. The blocks 156a-f are pivotally coupled to the dowel 152, and the blocks 158a-f are pivotally coupled the dowel 154. For pivotally coupling the blocks 156a-f and the blocks 158a-f, the dowel 152 and the dowel 154 are, respectively, inserted in through holes (not shown) configured on respective sides thereof. The blocks 156a-f and the blocks 158a-f are capable of rotating, respectively, along the dowel 152 and the dowel 154.

Each block of the blocks 156a-f is, preferably, a flat rectangular shaped block, and has a top surface and a bottom surface thereof. Each top surfaces of the blocks 156a-f include a set of numbers inscribed thereon (as shown in FIG. 2C). Similarly, each block of the blocks 158a-f is a flat rectangular shaped block, and has a top surface and a bottom surface thereof. Each top surfaces of the blocks 158a-f include a set of numbers inscribed thereon (as shown in FIG. 2C). Further, at least one block of the blocks 156a-f and/or the blocks 158a-f exposing a respective top surface thereof is being pivotally rotated about a respective dowel, such as the dowel 152 and the dowel 154, to expose a respective bottom surface thereof for recording the score, corresponding to at least one number from the set of numbers inscribed on the respective top surface of the at least one block of the blocks 156a-f and the blocks 158a-f, in the score record section 140.

Figure 3:
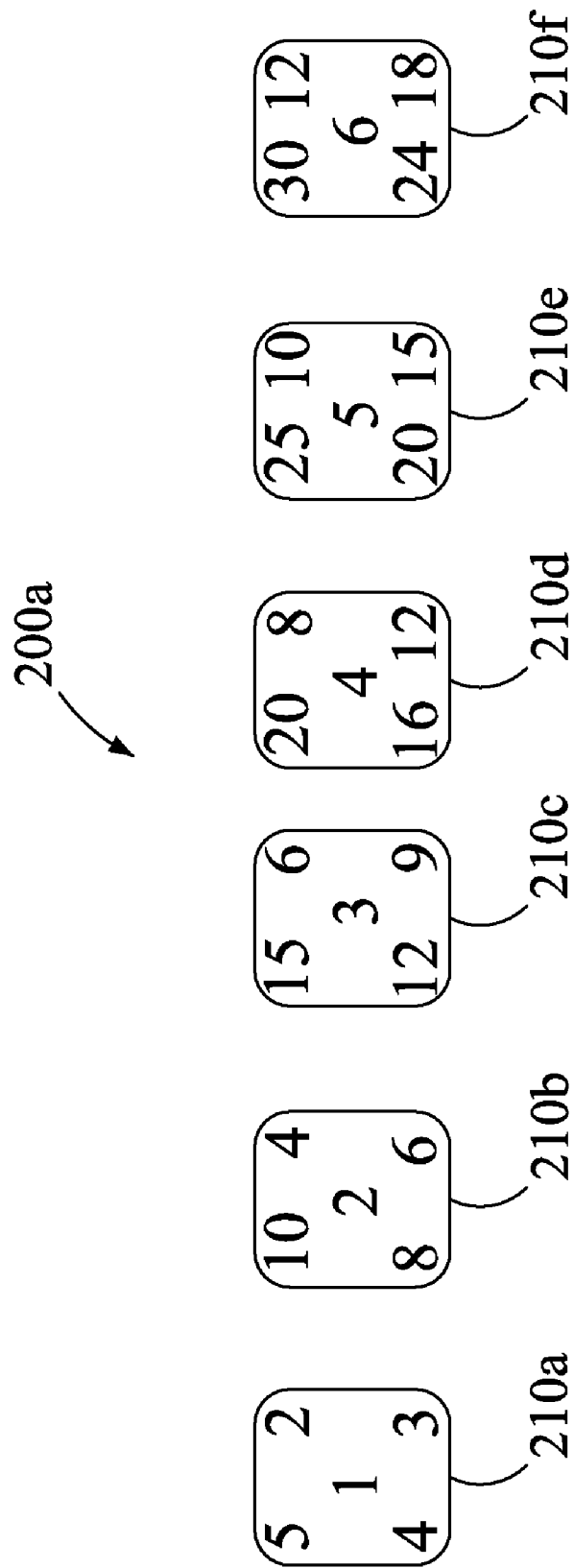
FIG. 3 illustrates front views of various faces of a die of a pair of dice of the educational game apparatus of FIG. 1, according to an embodiment of the present invention.

Referring now to FIG. 3, front views of various faces of the die 200a of the pair of dice 200 are illustrated, according to an embodiment of the present invention. References of FIGS. 1 to 2C will be made herein to describe the pair of dice 200. The pair of dice 200 is used for tossing to play the game. Each die, such as the die 200a and the die 200b of the pair of dice 200 configure six faces thereof. More particularly, the six faces, such as faces 210a, 210b, 210c, 210d, 210e and 210f (hereinafter referred to as faces 210a to 210f) of the die 200a are shown in FIG. 3. Each of the six faces, such as the faces 210a to 210f include a plurality of number inscribed thereon. As shown in FIG. 3, the face 210a includes a plurality of numbers inscribed thereon. Similarly the each of the face 210b to 210f includes a plurality of numbers inscribed thereon. Similar to the die 200a, each face of the die 200b (as shown in FIG. 1) includes a plurality of numbers (not shown), inscribed thereon.

According to one embodiment of the present invention, each number of the plurality of numbers on the face 210a has a definite color thereof. For example, a center number is a black colored number (herein after referred to as 'black number'), a top right number is a green colored number (herein after referred to as 'green number'), a bottom right number is a blue colored number (herein after referred to as 'blue number'), a bottom left number is a yellow colored number (herein after referred to as 'yellow number'), and, a top left number is a red colored number (herein after referred to as 'red number'). Similarly, pluralities of numbers on all respective faces, such as the faces 210b to 210f, at same positions may bear same colors.

Further, each colored number, such as the black number, the green number, the blue number, the yellow number, and the red number assumes a plurality of levels of the game, such as a level one, a level two, a level three, a level four and a level five. For example, the center number signifies the level one, the green number signifies the level two, the blue number signifies the level three, the yellow number signifies the level four, and the red number signifies the level five. Further, each level, such as the level one to the level five, has a definite point for defining a highest point of a respective level of the level one to the level five. For example, the level one has 500 points as the highest point associated therewith, the level two has 1000 points as the highest point associated therewith, the level three has 1500 points as the highest point associated therewith, the level four has 2000 points as the highest point associated therewith, and, the level five has 2500 points as the highest point associated therewith. However, it will be evident to a person skilled in the art that based on a user preference; desired number of points may be associated with various levels.

The plurality of numbers inscribed on each face, such as on the face 210a to 210f corresponds to at least one set of numbers inscribed on at least one top surface of the blocks 156a-f. For example, the face 210a corresponds to the top surface of the block 156a, and so on. Further, at least one top surface of the blocks 158a-f corresponds to a new number that is obtained by arithmetically operating two numbers of the die 200a and the die 200b for corresponding levels. For example, at the level one, the player may toss the die 200a and the die 200b, respectively, and obtains the black numbers 4 and 5. In order to obtain the new number, the player may perform arithmetical operations selected at least from multiplication, division, addition, and subtraction. Suppose the player performs addition arithmetical operation, the new number the player has obtained is 9. Accordingly, the new number 9 corresponds to the at least one top surface the blocks 158a-f. As shown in FIG. 2C, the new number 9 corresponds to the top surface of the block 158c.

Further, for playing the game and building-up the score, at least one number from the plurality of numbers inscribed on a corresponding die of the pair of dice 200 is matched with at least one number of the set of numbers inscribed on the top surfaces of the blocks 156a-f and/or the top surfaces of the blocks 158a-f. Further, the at least one of the block 158c is pivotally rotated to expose a respective bottom surfaces thereof for scoring points. For example, if the player wants to accumulate points according to the new number 9, the player may turn the top surface of the block 158c to expose the bottom surface thereof, and accordingly moving 9 black beads from the black beads 146a, 146b, and 146c in order to accumulate the points to build up the score in the bottom set of dowels 142.

Further, if desired, the player may directly match any of the black numbers, either 4 or 5, and turns corresponding top surface of the blocks 156a-f in order to accumulate the points to build up the score.

Referring back to FIGS. 1, 2A and 2C, the winner indication member 300 indicates the winner player among the plurality of players playing the game. According to one embodiment of the present invention, the winner indication member 300 is a country flag, such as a United States country flag. However, it will be evident to a person skilled in the art any desired element apart from the country flag (as disclosed herein) may be used as a winner indication member for the purpose of the playing the game. The winner indication member 300 may be secured the rack 100, at a spot 310 (as shown in FIGS. 2A and 2C) configured on the lateral member 110a.

It is understood from the preceding description that an educational game apparatus, such as the apparatus 1000 is configured for playing the game. The game is preferably played by two to four players. However, it will be evident to a person skilled in the art that the game may be played by involving more than four players for playing the game. For playing the game, each player may be provided with one rack, such as the rack 100. Further, the each player may agree to play one common level, selected at least from the level 1 to the level 5, as described above. Furthermore, all the blocks 156a-f and the blocks 158a-f are arranged to expose the top surfaces thereof. Each player may choose the lucky number from one to six, and denote the lucky number chosen by him/her in the turn record section 130 by sliding the pink beads 132a to the blank side of the first dowel 132 for recording the lucky number. The chosen lucky number remains same through out the game. The lucky number is used to accumulate bonus points during the game.

The game is played in a number of rounds, and in each round, each player gets a turn to play. For beginning the game, each player may toss the pair of dice 200 for attaining a highest number to get a chance to begin his/her turn, and accordingly turns are followed by the each player in clockwise direction.

The player with the highest number may begin the turn thereof, and toss the pair of dice 200, such that one of the six faces of the die 200a and the die 200b are exposed, revealing the plurality of numbers (as shown in FIG. 3) inscribed thereon. If the plurality of numbers revealed on the die 200a and the die 200b corresponds to the set of numbers on any of the top surfaces of the blocks 156a-f, and the top surfaces of the blocks 158a-f, the player gains the points to build up the score.

To build up the score, various methods may be used, and decided by the players depending upon the level of the game. For example, if the player is playing the first level, the player may choose the black numbers from the exposed faces of the die 200a and the die 200b. There may be two methods to build up the score, as described above. Further, for purpose of better understanding, the two methods are described below with examples.

In the first method, the arithmetic operations, such as multiplication, division, addition, and subtraction are used to build up the score. For example, for the level one, if the die 200a and the die 200b, respectively, shows the black numbers 2 and 6, then the player may perform addition: 6+2=8; subtraction: 6−2=4; multiplication: 6*2=12, and division: 6/2=3, to obtain the new number to build up the score.

A second method involves direct matching of the numbers, wherein the player may choose any one number or both numbers, separately to build up the score. For example, for the level one, if the die 200a and the die 200b, respectively, shows the black numbers 2 and 6, then the player may choose the black number 2, or may choose the black number 6, or may choose both of the black numbers 2 and 6, to build up the score.

Upon deciding a particular method from the above methods, a number may be chosen, and accordingly, the player may rotate corresponding top surface of a corresponding block from the blocks 156a-f and the blocks 158a-f, for accumulating the points, and recording the points in the score record section 140, to build up the score. For example, if the player has chosen the first method, and performs addition, the new number is 8. Accordingly, the player may turn the block 158b to expose the bottom surface thereof, and thereafter immediately record the points in the score record section 140 by moving eight black beads, such as the black beads 146a to the blank side of the dowel 142a. Further, if the player has chosen the second method, he/she may turn the block 156b, or, the block 156f, or, the blocks 156b and 156f, and thereafter immediately record points similar to the points on the block 156b, or, the block 156f, or, the blocks 156b and 156f by moving corresponding black beads, such as the black beads 146a, 146b and 146c, respectively, towards the blank side of the dowel 142a, 142b and 142c in the score record section 140. Further, the white beads 148a, 148b, 148c and 148d may also be utilized, as described above, to record the score.

Furthermore, if the numbers revealed on the die 200a and the die 200b are similar and equal to the lucky number chosen by any player, then the corresponding player may gain, say 50 bonus points. The 50 bonus points gained by the player are denoted to the black beads 146a, 146b and 146c to the blank side of the dowel 142a, 142b and 142c, respectively, in the score record section 140. For gaining the 50 bonus points, the player has to generate a sound, such as "double".

After completion of one turn, each player of the plurality of players may move one yellow bead from the yellow beads 134a towards the blank side of the second dowel 134 to record the one turn. Accordingly, upon completion of each round one yellow bead from the yellow beads 134a is moved to the blank side of the second dowel 134.

Further, the player may continue playing, and may keep tossing the pair of dice 200 to keep gaining the points to build up the score. If during the turn of the player, all the blocks 156a-f and the blocks 158a-f are rotated to expose respective bottom surfaces thereof, the player gets, say 100 bonus points, which may be added to the score record section 140 in similar manner, as described above.

The turn of the player continues until all the blocks 156a-f and the blocks 158a-f may be rotated to expose the respective bottom surfaces thereof. At this stage, the player may not get chance to toss the pair of dice 200, but may gain, say 50 bonus points, if the numbers revealed on the die 200a and the die 200b are similar and equal to the lucky number chosen by him/her.

Furthermore, if the numbers revealed on the die 200a and the die 200b are similar and equal to the lucky number chosen by any player, then the player gets double chance to toss the pair of dice 200, whether or not, all the blocks 156a-f and the blocks 158a-f are turned to expose bottom surfaces thereof.

Accordingly, each player may get the pair of dice 200 to play during his/her respective turns, to build up the score in each round of the game to reach the game goal. The game comes to an end when any one of the player reaches or exceeds the game goal, such as the game goal of 500 points for level one. Such a player is declared the winner player among the plurality of players. The winner player of the game may be allowed to secure the winner indication member 300 on the rack, such as the rack 100 thereof, thereby indicating winner among the plurality of players playing the game.

An educational game apparatus, such as the apparatus 1000 of the present invention offers the following advantages. The educational game apparatus is simple in construction, and involves simple rules and an abacus method to score goals or points. The educational game apparatus, on one hand, assists children and others in learning and understanding basic mathematical processes and operations, and on other hand, enhancing their memory skill, decision making approach, and also to entertain them without wearing out excitement associated therewith. The educational game apparatus involves five different skills levels in brilliant colors, exciting rules for doubles, extra points, and bonus points. The educational game apparatus may be made from highest quality of materials and craftsmanship, and is family friendly pastime that can be played in an array of venues, including homes, schools, waiting rooms, day care center, schools, medical facilities and military bases.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. An educational game apparatus for playing a game by a plurality of players, the educational game apparatus comprising:
   a playing rack member comprising a pair of lateral members spaced apart in parallel relation to one another, and a plurality of transverse members spaced apart in parallel relation to one another, and disposed between the pair of lateral members for configuring,
      a turn record section comprising a first plurality of dowels spaced apart and disposed parallel to the plurality of transverse members, each dowel of the first plurality of dowels having a first plurality of beads slidably disposed there along for recording turns played by a player of the plurality of players during the game, and for recording a lucky number selected by the player,
      a score record section adjacent to the turn record section, the score record section comprising a second plurality of dowels spaced apart and disposed parallel to the plurality of transverse members, each dowel of the second plurality of dowels having a second plurality of beads slidably disposed there along for recording score accumulated by the player during the game, and
      a number section adjacent to the turn record section, the number section comprising a third plurality of dowels spaced apart and disposed parallel to the plurality of transverse members, each dowel of the third plurality of dowels having a plurality of blocks pivotally coupled there along, wherein each block of the plurality of blocks comprises a top surface and a bottom surface, the top surface has a set of numbers inscribed thereon, and, wherein at least one block of the plurality of blocks exposing a top surface thereof capable of being pivotally rotated about a respective dowel of the third plurality of dowels to expose a respective bottom surface for recording the score, corresponding to at least one number from the set of numbers inscribed on the respective top surface, in the score record section;
   a pair of dice, each die of the pair of dice configuring six faces thereof, each face of the six faces of the pair of dice comprising a plurality of numbers inscribed thereon, wherein the plurality of numbers on the each face of at least one die of the pair of dice corresponds to at least one set of numbers inscribed on at least one top surface of at least block of the plurality of blocks, and, wherein upon matching at least one number from the plurality of numbers inscribed a corresponding die of the pair of dice with at least one number of the set of numbers inscribed on a corresponding top surface of the plurality of blocks, the player pivotally rotates at least one block to expose a respective bottom surface thereof from the plurality of blocks of the number section; and
   a winner indication member capable of being secured on the playing rack member indicating a winner player among the plurality of players playing the game.

2. The educational game apparatus of claim 1, wherein the first plurality of dowels comprises a first dowel having a first set of beads of the first plurality of beads for recording the turns played by the player.

3. The educational game apparatus of claim 1, wherein the first plurality of dowels comprises a second dowel having a second set of beads of the first plurality of beads for recording the lucky number selected by the player.

4. The educational game apparatus of claim 1, wherein the second plurality of dowels comprises a bottom set of dowels having bottom sets of beads of the second plurality of beads for recording the score.

5. The educational game apparatus of claim 4, wherein the second plurality of dowels comprises a top set of dowels having top sets of beads of the second plurality of beads for transferring the score from the first set of dowel to the second set of the dowels.

6. The educational game apparatus of claim 1, wherein the plurality of numbers on the each face of the six faces of the pair of dice assumes a plurality of levels of the game.

7. The educational game apparatus of claim 6, wherein each level of the plurality of levels has a definite point for defining a highest point of the each level.

8. The educational game apparatus of claim 1, wherein for matching the at least one number from the plurality of numbers from corresponding dice of the pair of dice, an arithmetical operation is performed to obtain a new number to expose a bottom surface of the at least one block corresponding to the new number for recording the score.

9. The educational game apparatus of claim 8, wherein the arithmetical operation is one of multiplication, division, addition, and subtraction.

10. The educational game apparatus of claim 1, wherein the at least one number from the plurality of numbers inscribed a corresponding die of the pair of dice is directly matched with at least one number of the set of numbers inscribed on a corresponding top surface of the plurality of blocks to expose a corresponding bottom surface of the at least one block.

* * * * *